United States Patent [19]

Pallat

[11] Patent Number: 4,562,939

[45] Date of Patent: Jan. 7, 1986

[54] PILL CONTAINER

[76] Inventor: Jerome F. Pallat, 427 Third St., Fairport Harbor, Ohio 44077

[21] Appl. No.: 572,547

[22] Filed: Jan. 20, 1984

[51] Int. Cl.[4] .............................................. B65G 59/00

[52] U.S. Cl. ............................ 221/312 R; 221/312 C; 604/77; 206/530; 206/539

[58] Field of Search ........................ 604/77, 57, 59, 60; 206/540, 530, 538, 539, 537; 221/185, 312 C, 306, 303, 89, 91; 222/522

[56] References Cited

U.S. PATENT DOCUMENTS

| | | | |
|---|---|---|---|
| 2,353,629 | 7/1944 | Apfelbaum | 206/536 |
| 2,367,019 | 1/1945 | Haag | 206/539 |
| 3,031,070 | 4/1962 | Mulder | 206/540 |
| 4,237,884 | 12/1980 | Erickson et al. | 604/77 X |
| 4,420,076 | 12/1983 | Beveridge et al. | 206/540 X |

*Primary Examiner*—Joseph J. Rolla
*Assistant Examiner*—David H. Bollinger
*Attorney, Agent, or Firm*—Frank B. Robb

[57] ABSTRACT

A pill container having a body with a cavity for receiving a pill formed therein, a cover slidably arranged on the body to cover the cavity being retained in cavity covering position by the mating arrangement of the body and cover, the cover being further arranged to be moved by engagement of the cover with the teeth of a user, and movement of the body inwardly of such user's mouth to position the cavity therewithin permitting a pill to drop from the cavity, into the user's mouth as the pill will provide the necessary reaction sought.

4 Claims, 5 Drawing Figures

PILL CONTAINER

BACKGROUND OF THE INVENTION

The invention contemplated hereby, is one which is very desirable to have available for use by a person who suffers from periodic attacks which may be alleviated by the taking of a pill of some kind orally and which pill might normally be of such small size that it would be difficult to select from the usual container in which pills are stored and often because of the difficulty of opening the container not readily available when the user actually needs it.

Such occasions are those which might be the result of angina attacks where the potential user is in such pain that the very act of attempting to extract a pill from the usual container is often too much and takes too long to provide the necessary relief which is available by the taking of such a pill.

Under the circumstances it will be appreciated that any means which may be provided to make the pill available very quickly and with a minimum amount of manipulation will provide a substantial improvement in the pill dispensing field.

With the foregoing in mind, there are of course myriad numbers of pill dispensing means or containers, but none with which I am familiar having the various attributes of my container and my familiarity with the prior art does not provide me with any knowledge of a prior patent which is of particular moment although there are many patents in the pill container art including the patent of Robbins, U.S. Pat. No. 3,678,884 wherein the dispenser or the person who uses the article raises the cap to an open position and lowers the cap to a closed position. This is a simple arrangement to provide for obtaining pills but again not as simple as my contemplated device.

Another patent with which I am familar, U.S. Pat. No. 4,154,365 provides for a reciprocation of body parts 1 and 2 to uncover an opening for a pill, but not arranged in anything like the manner of my disclosure nor as easily manipulated to provide quick and easy access to the pill or dispensing of such pill.

Another patent with which I am familiar, U.S. Pat. No. 4,171,753 discloses a pill dispenser with a spring pressure against the pill which is dispensed through diametrically opposed slots. Again a much more complicated structure and certainly one which is not as readily manipulable as the disclosure which I have set forth herein.

With the foregoing prior art known to me, I believe that my pill container constitutes a substantial advance and simple advantage which carries out the desired facility of use with a substantially improved manner or way of not only containing the pill but of dispensing the same.

DETAILED DESCRIPTION OF THE INVENTION

The various improvements which are disclosed and which have been suggested by the foregoing, are described in detail in the specification appended hereto and shown in the drawing wherein:.

Figure 1:
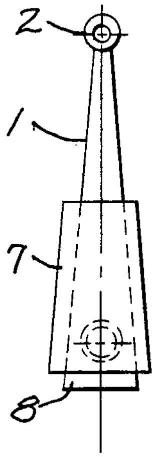
FIG. 1 is a view showing the pill dispenser of my invention in its normal vertical position for carrying or attachment to a user as will be set forth.

Turning to a consideration of FIG. 1, it will be noted that the pill container of my invention includes a body 1 of what may be generally termed conical shape, having at its upper end a ring like element 2 which is provided to enable the container of my invention to be supported around the neck of a user by a suitable chain or by other means.

Figure 2:
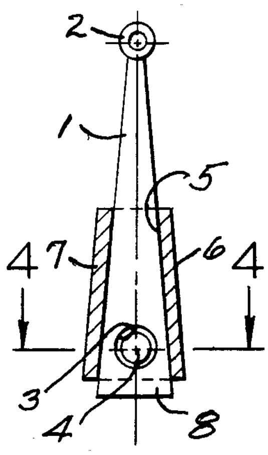
FIG. 2 is a view partly in section showing the respective parts of my pill container and the cavity within which the pill is contained suggesting the manner of use thereof.
Figure 4:
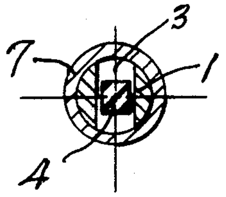
FIG. 4 is a sectional view about on the line 4—4 of FIG. 2 looking in the direction of the arrows.

Turning to FIG. 2 it will be observed that the body 1 of my container includes at its lowermost portion a cavity 3 extending therethrough as observed in FIG. 4, and intended to support therewithin a pill such as denoted at 4 which in the case and for the purposes of this container may be a nitroglycerin pill which is desirable to be available for a user who is subject to angina attacks.

The cover for the cavity 3, is a part having a mating conical portion or surface 5 therewithin the interior for the purposes hereof likewise being conical for ease of use and manufacture and denoted at 6. This is obviously a sleeve-like member, which is designated for the purposes hereof as 7 and called a cover hereinafter.

It will be understood that the cover 7 is maintained in cavity covering position by the engagement of the inner surface 5 with the exterior of the conical body 1 and as such of course thus provides a good sealed closure for the cavity 3.

It will be noted that the lower end of the body 1 and denoted at 8 extends beyond the lowermost portion of the cover 7, the usual position of the entire container being upright as viewed and as supported upon around a chain or the like around the neck of a user.

It is important to note that the portion 8 does in fact extend sufficiently beyond the lowermost edge of the cover 7 for purposes which will be subsequently explained.

Figure 3:
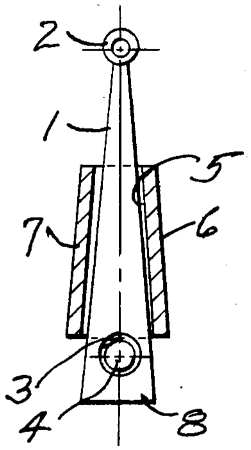
FIG. 3 is a view partly in section showing the cover of my pill container in cavity revealing position for permitting the pill to be dispensed therefrom.

In FIG. 3 the cover 7 is shown as having been moved upwardly relative the body 1 so as to expose the cavity 3 and obviously a pill such as 4 contained therewithin. In fact such exposure will normally permit the pill to be readily extracted or spilled out of the body 1 as will be readily understood since the cavity is of such size as to permit this to take place and without any frictional or other element to restrict or restrain such pill movement for purposes which will be apparent in the further description.

With the various relationships thus set forth and explained, it should be pointed out that the method of use of this container is a very important aspect, since it does in fact make a pill such as a nitroglycerin pill readily available to a person who is subject to such attacks as are most painful and in fact often are such that the user hardly realizes what is happening but by recollection can at least remember that a pill is supported in this container which is around his or her neck.

With that in mind, the user grasps the upper end of the pill container and particularly of course the body 1 thereof, places the end 8 between his or her teeth and pushes on the body in such a way as to move the cover 7 out of position over the cavity 3.

With this action, the cavity 3 is thus opened and the pill 4 therewithin permitted to fall into the mouth of such user and obviously be absorbed as it is intended so to be.

It is of course understood that this container is primarily for use under the circumstances hereinbefore outlined and thus obviously it is intended to contain only 1 pill or prescribed an additional of one or more because there is sufficient space in the cavity for that purpose. However as is customary the single pill is usually sufficient to overcome or at least alleviate the attack to which the user is being subjected.

It is of course necessary that the container be reloaded so to speak by placing another pill therewithin when the prior pill has been used, the manipulation required therefore being such as to permit the cover 7 to be moved with respect to the body 1 so that the cavity 3 will be exposed and a pill can be inserted there after the cover 7 being returned to its sealing position.

It will be further understood that the cover 7 is normally maintained by gravity in its lowermost position because the body 1 is suspended from the body of the user and thus the cover not only moves downwardly by gravity but provides a sealing arrangement such as to prevent any foreign material or even moisture from entering the cavity and destroying the pill or damaging the same so that it will not be useful.

Figure 5:
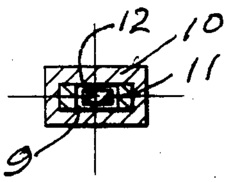
FIG. 5 is a sectional view of a pill dispenser similar to that disclosed in the other figures but of a slightly different shape in cross-section.

While the shape of the respective parts 1 and 7, the body and cover is shown as being a conical arrangement, it is also possible that under some circumstances a different shape of body might be desired in which case that suggested in FIG. 5 might be adopted including a rectangular cross-sectioned body 11 with a rectangular cross-section cover 10 similarly formed as in FIGS. 1, 2, and 3 so as to be movable upwardly and downwardly along the body and permit the cavity in this case denoted 9 to be opened when the cover 10 is moved with regard to the body 11 just referred to.

Obviously the pill 12 within the cavity 9 will be permitted to fall outwardly therefrom in a similar manner if the parts are arranged such as those parts in the prior figures wherein the lowermost extremity extends sufficiently beyond the cover to provide a guiding means and the lower edge of a cover the impinging elements or element against the teeth of a user.

I claim:

1. A pill container comprising a pill receiving body, the body being an elongated conically shaped member adapted to be vertically positioned with the largest end of said conically shaped member lowermost, a cavity extending through said body and being positioned near the lower largest end of the body to receive a pill therein, and a cover for said cavity mounted on said body, said cover being movable upwardly and downwardly on said body to open and close said cavity, said cover being normally retained in closed condition by gravity, the cavity being sealingly covered by the cover when the same is in its lowermost position, and may be moved out of cavity covering position with minimum effort.

2. A container as claimed in claim 1, wherein the extremity of the largest end of the body extends beyond the cover to provide a guide element to facilitate engagement of a portion of the cover with the teeth of a user to enable the cover to be moved readily out of cavity covering position.

3. A container as claimed in claim 1, wherein the shape of the body and cover are such as to position the cavity to permit a pill to drop therefrom into the mouth of a user, when the cover is placed against the teeth of such user and the body is moved toward the interior of such user's mouth.

4. A container as claimed in claim 1, wherein the body includes a portion which extends outwardly from the cover, and the cover is provided with a shoulder whereby the cover is movable away from cavity covering position by impingement on the teeth of a user to permit a pill in the cavity to drop in the mouth of such user.

* * * * *